United States Patent
Hsieh

(10) Patent No.: US 10,465,738 B2
(45) Date of Patent: Nov. 5, 2019

(54) LOCK THREADED ASSEMBLY

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 154 days.

(21) Appl. No.: 15/582,541

(22) Filed: Apr. 28, 2017

(65) Prior Publication Data
US 2017/0234357 A1 Aug. 17, 2017

Related U.S. Application Data

(63) Continuation-in-part of application No. 14/723,915, filed on May 28, 2015, now abandoned.

(51) Int. Cl.
*F16B 39/06* (2006.01)
*F16B 5/02* (2006.01)

(52) U.S. Cl.
CPC ............ *F16B 39/06* (2013.01); *F16B 5/0241* (2013.01)

(58) Field of Classification Search
CPC ................................. F16B 39/06; F16B 39/32
USPC .................. 411/217, 321, 322, 326
See application file for complete search history.

(56) References Cited

U.S. PATENT DOCUMENTS

| | | | | |
|---|---|---|---|---|
| 918,157 A * | 4/1909 | Jargick | ................... | F16B 39/32 411/326 |
| 947,069 A * | 1/1910 | Weinel | ................... | F16B 39/06 411/322 |
| 1,047,542 A * | 12/1912 | Lofland | ................... | F16B 39/06 411/322 |
| 1,129,787 A * | 2/1915 | Bright | ................... | F16B 39/06 411/322 |
| 1,387,172 A * | 8/1921 | Postel | ................... | F16B 39/32 411/322 |
| 1,722,231 A * | 7/1929 | Penney | ................... | F16B 39/32 411/326 |
| 2,179,604 A * | 11/1939 | Tinnerman | ............ | F16B 21/086 16/441 |

* cited by examiner

*Primary Examiner* — Flemming Saether
(74) *Attorney, Agent, or Firm* — Guice Patents PLLC

(57) ABSTRACT

A lock threaded assembly includes a bolt including a shank formed with a bolt head and having a threaded portion; at least one groove formed on the threaded portion; a nut including a threaded hole configured to secure to the threaded portion of the bolt; at least one trough formed on the threaded hole; and at least one engagement member being an elongated elastic strip body having a securing section and a received section, the securing section and the received section being able to elastically get closer to each other or move away from each other. When the groove is not aligned with the trough, the bolt and the nut are not locked by the engagement member; when the groove is aligned with the trough, the bolt and the nut are elastically locked by the engagement member.

13 Claims, 10 Drawing Sheets

LOCK THREADED ASSEMBLY

This application is a Continuation-in-Part of application Ser. No. 14/723,915, entitled BOLT AND NUT COMBINATION HAVING A POSITIONING DEVICE, filed on May 28, 2015.

BACKGROUND OF THE INVENTION

1. Field of the Invention

The invention relates to threaded fasteners and more particularly to a bolt and nut combination having a positioning device disposed in between the bolt and the nut so that clamped components can be fastened by the bolt and nut combination without being loosened.

2. Description of Related Art

Bolt and nut combinations are typically used to fasten clamped components. However, clamped components fastened by the fastening of the bolt and the nut may be loosened in a highly vibrating environment, a high temperature environment or the like.

A conventional bolt 74 and nut 72 combination is shown in FIG. 14. Two opposite, resilient urging devices 70 are disposed in between the nut 72 and the threaded portion of the bolt 74. The urging devices 70 urge against both the threaded portion of the bolt 74 and the nut 72 to increase the fastening. However, it is highly possible that the bolt 20 and the nut 30 may be loosened in a highly vibrating environment, a high temperature. Thus, the need for improvement still exists.

SUMMARY OF THE INVENTION

It is therefore one object of the invention to provide a lock threaded assembly comprising
- a bolt having a bolt head and a shank, an outer circumference of the shank being formed with a threaded portion;
- at least one groove formed on the circumference of the shank of the bolt;
- a nut having a threaded hole having a hole wall, the shank of the bolt being screwed in the threaded hole of the nut;
- at least one trough formed on the hole wall of the nut; and
- at least one engagement member, the engagement member being an elongated elastic strip body having a securing section and a received section, the securing section and the received section being able to elastically get closer to each other or move away from each other, the received section being disposed in the groove of the bolt/the trough of the nut; whereby the securing section is able to engage with the trough of the nut/the groove of the bolt, when the groove is not aligned with the trough, the securing section being moved toward the received section and moved into the groove of the bolt/the trough of the nut, when the groove is aligned with the trough, the securing section being moved into the trough of the nut/the groove of the bolt, the bolt and the nut are elastically locked by the engagement member.

The above and other objects, features and advantages of the invention will become apparent from the following detailed description taken with the accompanying drawings.

DETAILED DESCRIPTION OF THE INVENTION

Figure 1:
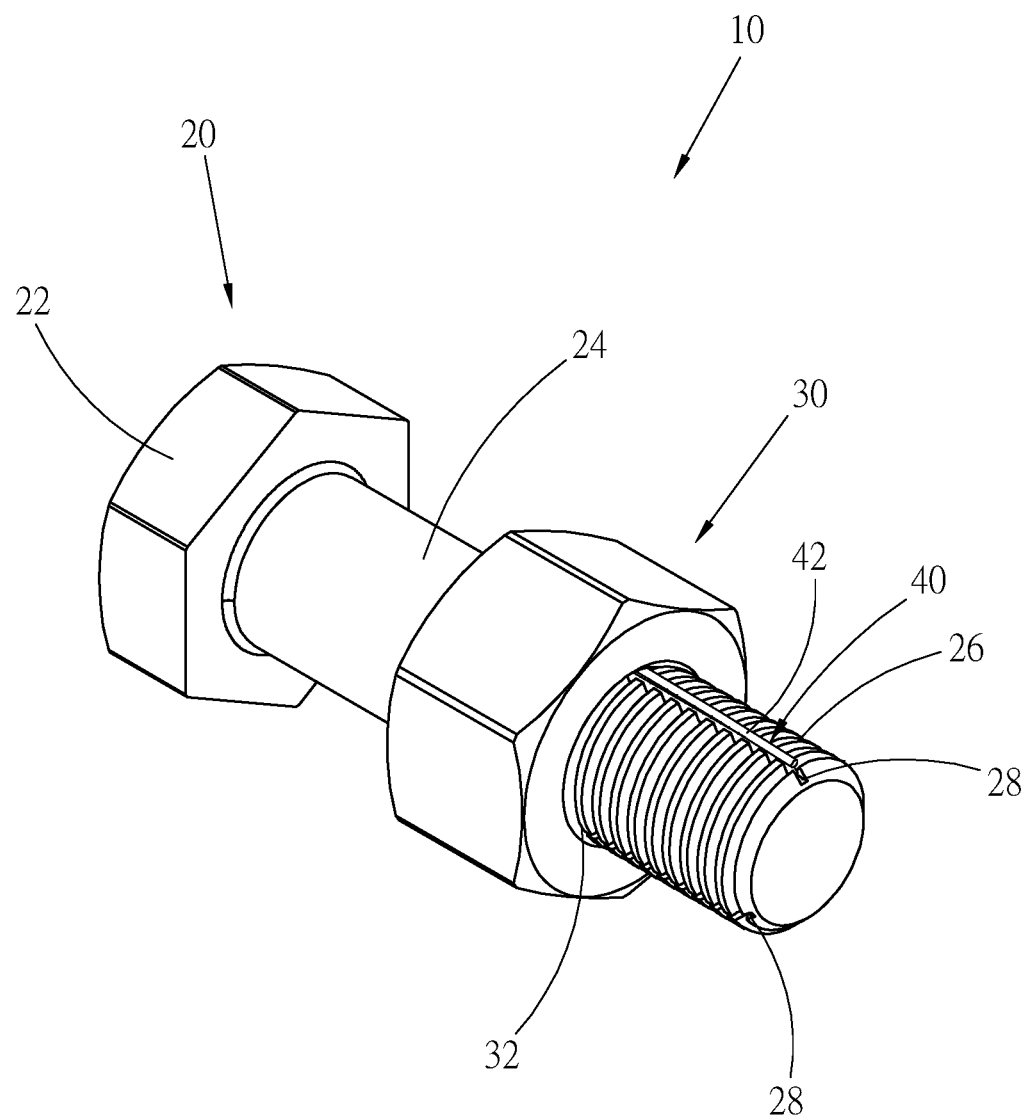
FIG. 1 is a perspective view of a bolt and nut combination having a positioning device according to a first preferred embodiment of the invention.
Figure 2:
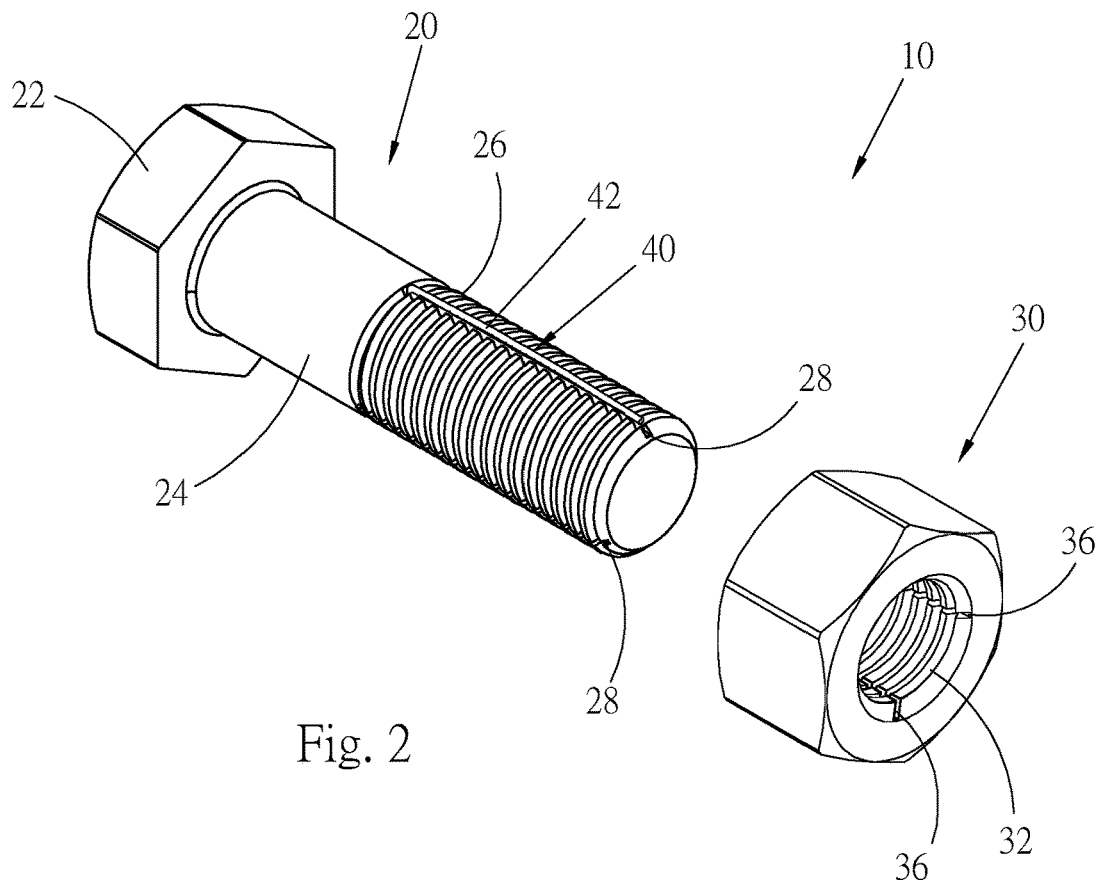
FIG. 2 is an exploded view of FIG. 1 with the positioning device removed.
Figure 3:
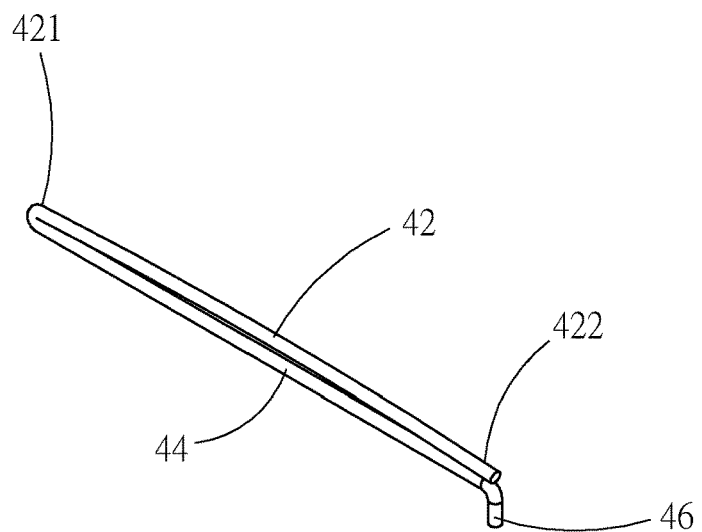
FIG. 3 is a perspective view of the positioning device.

Please refer to FIGS. 1 to 4. According to a first embodiment, the lock threaded assembly 10 of the present invention includes a bolt 20 having a bolt head 22 and a shank 24. The outer circumference of the shank 24 is formed with a threaded portion 26.

At least one groove 28 is formed on the circumference of the shank 24 of the bolt 20. In this embodiment, there is one groove 28 formed on the circumference of the shank 24. One end of the groove 28 has a socket 281 inward recessed from the shank 24. The longitudinal direction of the groove 28 and the axial direction of the shank 24 of the bolt 20 contain a non-right angle, for example, an angle ranging from 0 degree to 60 degrees. Preferably, the longitudinal direction of the groove 28 is parallel to the axial direction of the shank 24.

The lock threaded assembly 10 of the present invention further includes a nut 30 having a threaded hole 32. The shank 24 of the bolt 20 is screwed in the threaded hole 32 of the nut 30.

At least one trough 36 is formed on the hole wall of the nut 30. In this embodiment, there are three troughs 36 formed on the hole wall of the nut 30 at equal intervals. The longitudinal direction of the three grooves 36 and the axial direction of the threaded hole 32 of the nut 30 contain a non-right angle, for example, an angle ranging from 0 degree to 60 degrees. Preferably, the longitudinal direction of the grooved 36 are parallel to the axial direction of the shank 24.

The lock threaded assembly 10 of the present invention further includes at least one engagement member 40. The engagement member 40 is an elongated elastic metal strip body. In this embodiment, there is one engagement member 40. Please refer to FIGS. 3 to 4. The engagement member 40 has a securing section 42, a received section 44 and an insertion section 46. The securing section 42 and the received section 44 are side by side positioned. The securing section 42 has a connection end 421 and a free end 422. The connecting end 421 is connected to one end of the received section 44. The securing section 42 and the received section 44 have elasticity and can elastically swing, whereby the securing section 42 and the received section 44 can elastically get closer to each other or move away from each other. In addition, the securing section 42 is formed in an arcuate shape. The configuration of the arcuate shape makes a larger gap between the middle of the body of the securing section 42 and the received section 44. The free end 422 is close to the received section 44 and has a smaller gap therebetween. The insertion section 46 outward extends from one end of the received section 44. The insertion section 46 and the received section 44 contain a predetermined angle, for example, a right angle or a substantially right angle. In this embodiment, the received section 44 of the engagement member 40 is disposed in the groove 28 of the bolt 20 with the insertion section 46 inserted in the socket 281, whereby the engagement member 40 is connected with the bolt 20. In normal state, the securing section 42 elastically outward expands to slightly protrude from the groove 28.

It should be noted that two sidewalls of the groove 28 can tighten the received section 44 of the engagement member 40 so as to securely mount the engagement member 40 in the groove 28.

Figure 4:
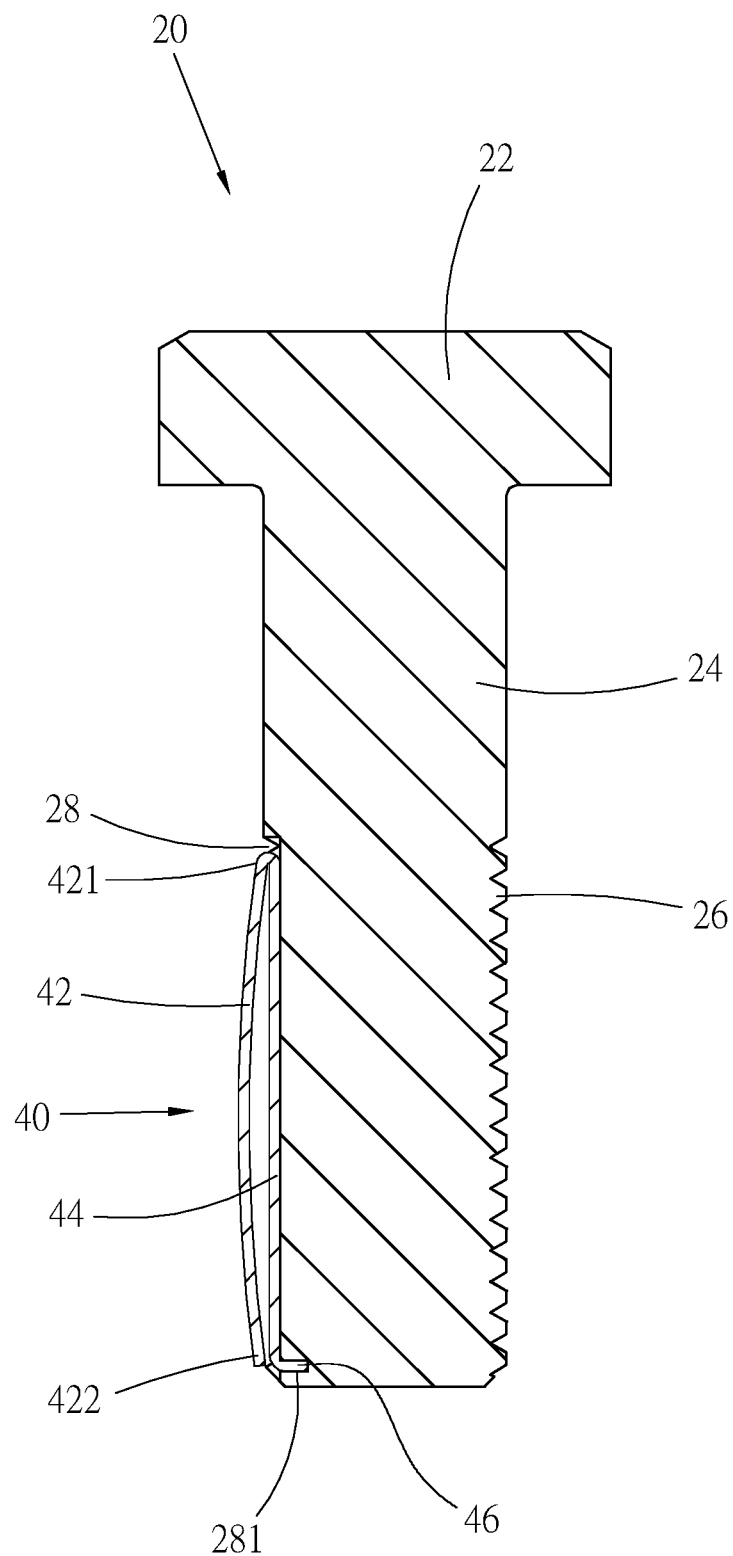
FIG. 4 is a longitudinal sectional view of the bolt with the positioning device disposed in the groove and hole.
Figure 5:
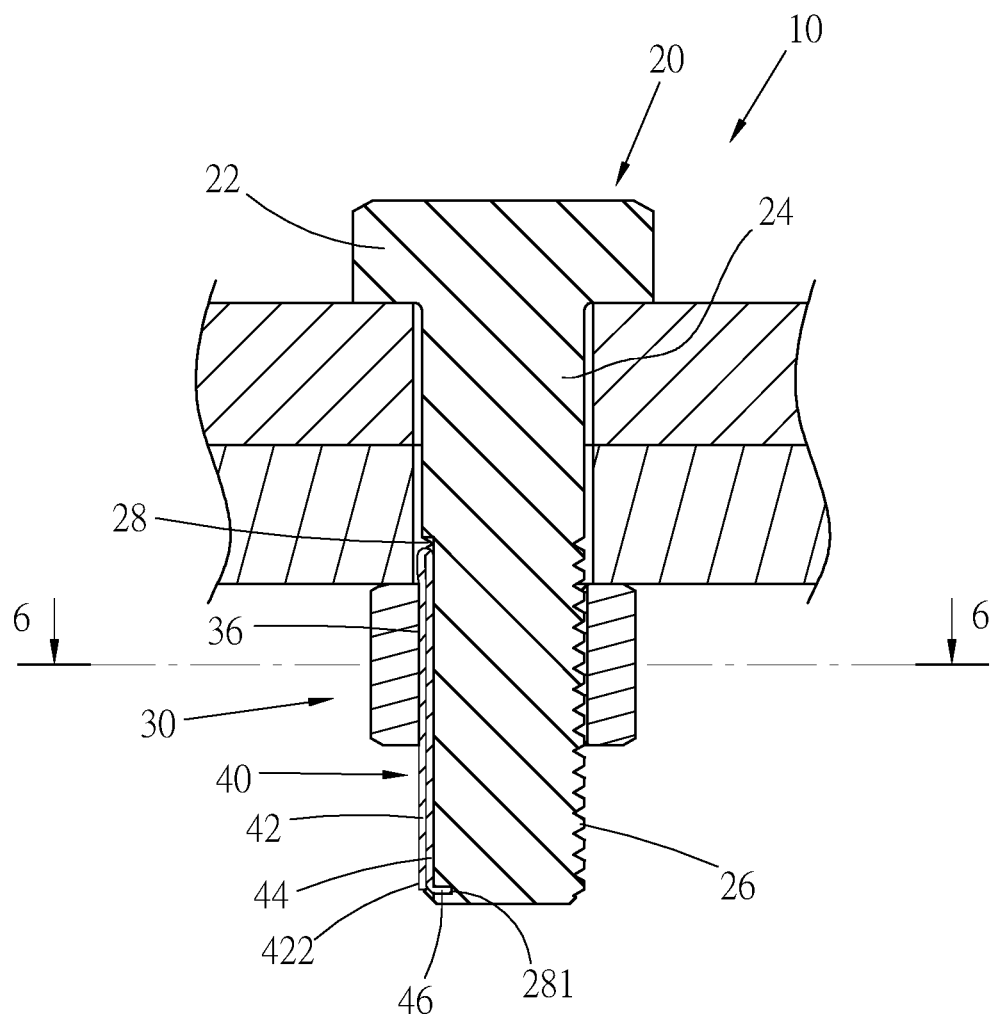
FIG. 5 is a longitudinal sectional view of the bolt and nut combination having the positioning device disposed in between the bolt and the nut for fastening two clamped components together.
Figure 6:
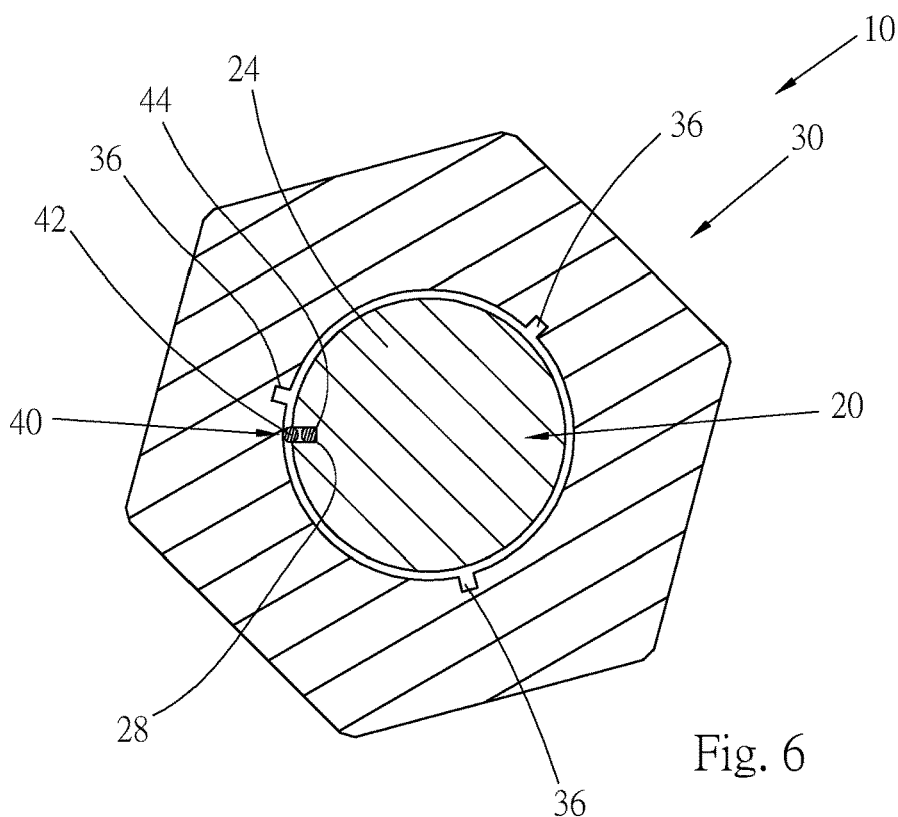
FIG. 6 is a sectional view taken along line 6-6 of FIG. 5 showing that the bolt and the nut are not locked by the engagement member.
Figure 6A:
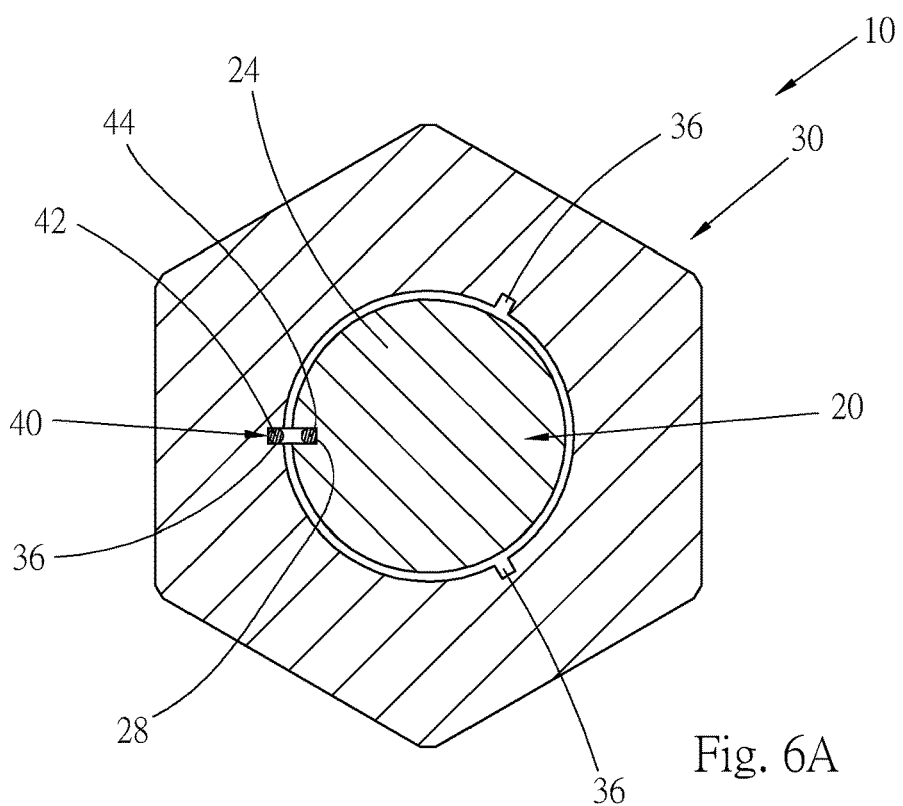
FIG. 6A is a sectional view which shows that the bolt and the nut are elastically locked by the engagement member.
Figure 7:
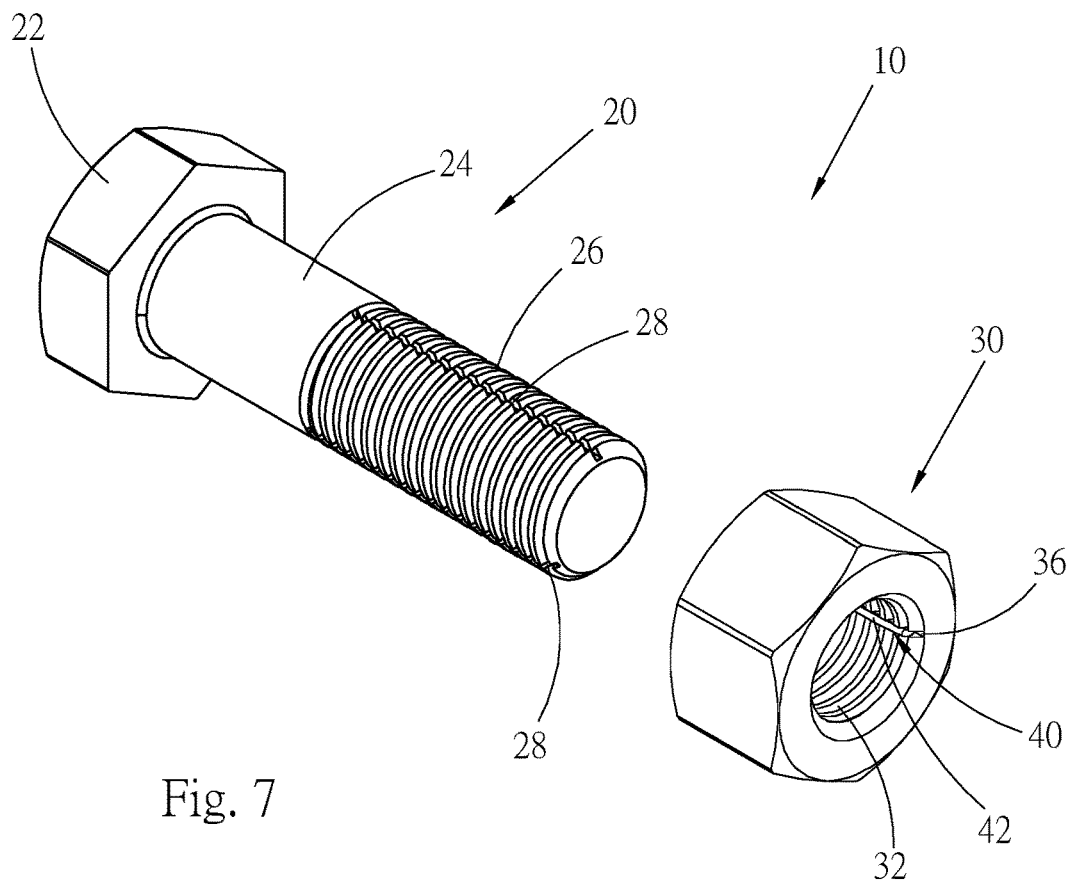
FIG. 7 is a perspective view of a bolt and nut combination according to a second preferred embodiment of the invention, a positioning being disposed in the trough of the nut which is separated from the bolt.
Figure 8:
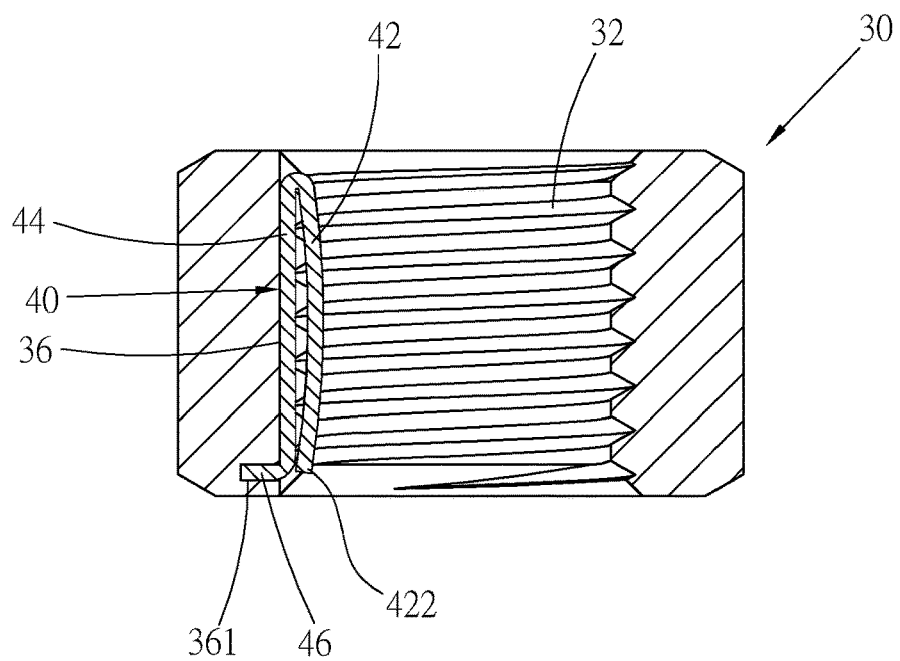
FIG. 8 is a longitudinal sectional view of the nut of FIG. 7 showing the positioning device disposed in the trough of the nut.
Figure 9:
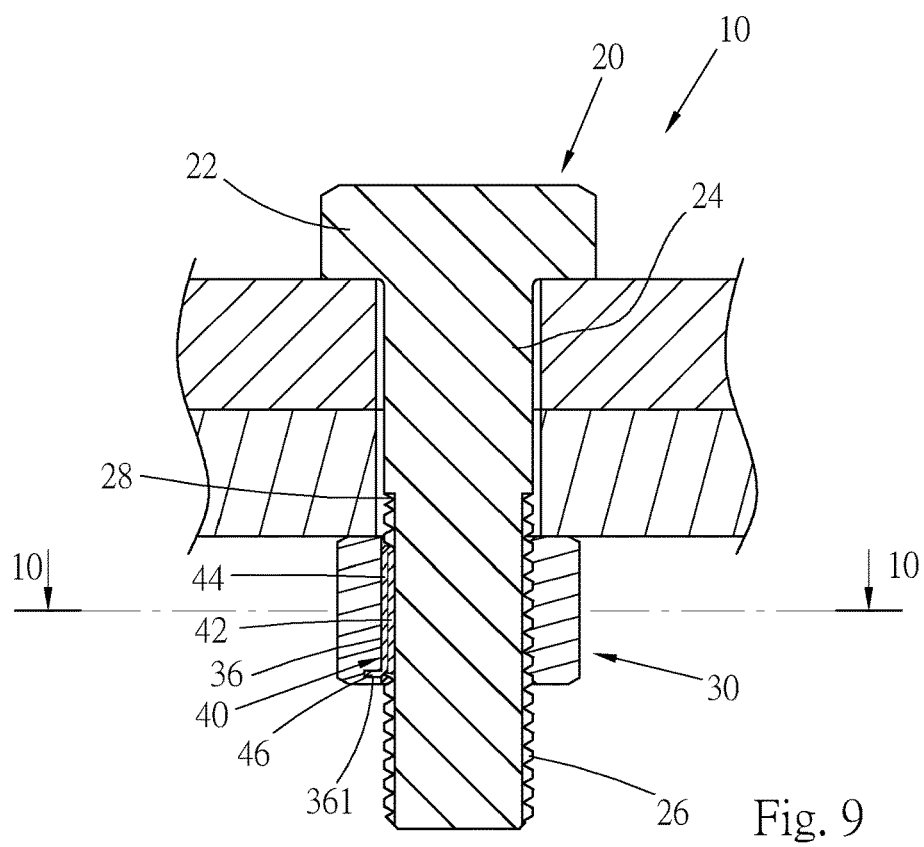
FIG. 9 is a longitudinal sectional view of the bolt and nut combination of FIG. 7 having the positioning device disposed in between the bolt and the nut for fastening two clamped components together.

Please now refer to FIGS. 5 and 6, which show that the bolt 20 is screwed in the nut 30 for tightening an article. As shown in FIG. 4, since the free end 422 of the securing section 42 is close to the received section 44 and is not protruding, thus, when the nut 30 is screwed on the bolt 20, the securing section 42 does not obstruct the nut. When the bolt 20 is screwed into the nut 30, in case the groove 28 is not aligned with the trough 36, the securing section 42 of the engagement member 40 is pressed by the hole wall of the nut 30 to elastically move toward the received section 44 of the engagement member 40 and move into the groove 28 of the bolt 20. At this time, both the securing section 42 and the received section 44 are positioned in the groove 28 and the nut is not hindered by the securing section 42 from rotating. Accordingly, the nut 30 can be rotated to align the trough 36 with the groove 28 of the bolt 20 as shown in FIG. 6A. At this time, the securing section 42 is released from the pressing to elastically outward expand and engage into the trough 36 of the nut 30; the nut and the bolt are elastically locked by the engagement member. When the nut 30 is further rotated, the trough 36 is mis-aligned with the groove 28, whereby the securing section 42 is moved out of the through 36 and is again pressed by the wall of the threaded hole 32 to move toward the received section 44. Accordingly, when the nut 30 is rotated relative to the bolt 20, the securing section 42 of the engagement member 40 will elastically swing. When the securing section 42 is elastically moved into the trough 36 of the nut 30, a locating feeling is produced for a user to judge whether the securing section 42 of the engagement member 40 is engaged in the trough 36 of the nut 30 or not.

As shown in FIG. 6A, after the bolt 20 is securely screwed in the nut 30, the securing section 42 of the engagement member 40 is engaged in the trough 36 of the nut 30, while the received section 44 of the engagement member 40 is engaged in the groove 28 of the bolt 20. This can enhance the screw-connection strength between the bolt 20 and the nut 30. Accordingly, the threaded assembly 10 is prevented from loosening due to high-frequency vibration, high voltage or high heat. In this case, the security of the threaded assembly 10 is enhanced.

Please now refer to FIGS. 7 to 10, which show a second embodiment of the threaded assembly 10 of the present invention. The same components are denoted with the same reference numerals and will not be repeatedly described hereinafter. The second embodiment is different from the first embodiment in that in the second embodiment, there are three grooves 28 formed on the shank 24 of the bolt 20 at equal intervals. The three grooves 28 and the axial direction of the shank 24 of the bolt 20 contain a non-right angle.

In the second embodiment, there is one trough 36 formed on the hole wall of the nut 30. One end of the trough 36 has a socket 361 inward recessed from the hole wall. The groove 36 and the axial direction of threaded hole 32 of the nut 30 contain a non-right angle.

In the second embodiment, there is one engagement member 40. The received section 44 of the engagement member 40 is inlaid in the trough 36 of the nut 30 with the insertion section 46 inserted in the socket 361 of the nut 30. The securing section 42 of the engagement member 40 slightly protrudes from the trough 36 of the nut 30. As the same, the securing section 42 of the engagement member 40 is formed in an arcuate shape. The free end 422 is close to the received section 44 without interfering with the nut being screwed on the bolt 20.

It should be noted that the securing section 42 can be inserted in the trough 36 to connect the engagement member 40 with the nut 30.

Figure 10:
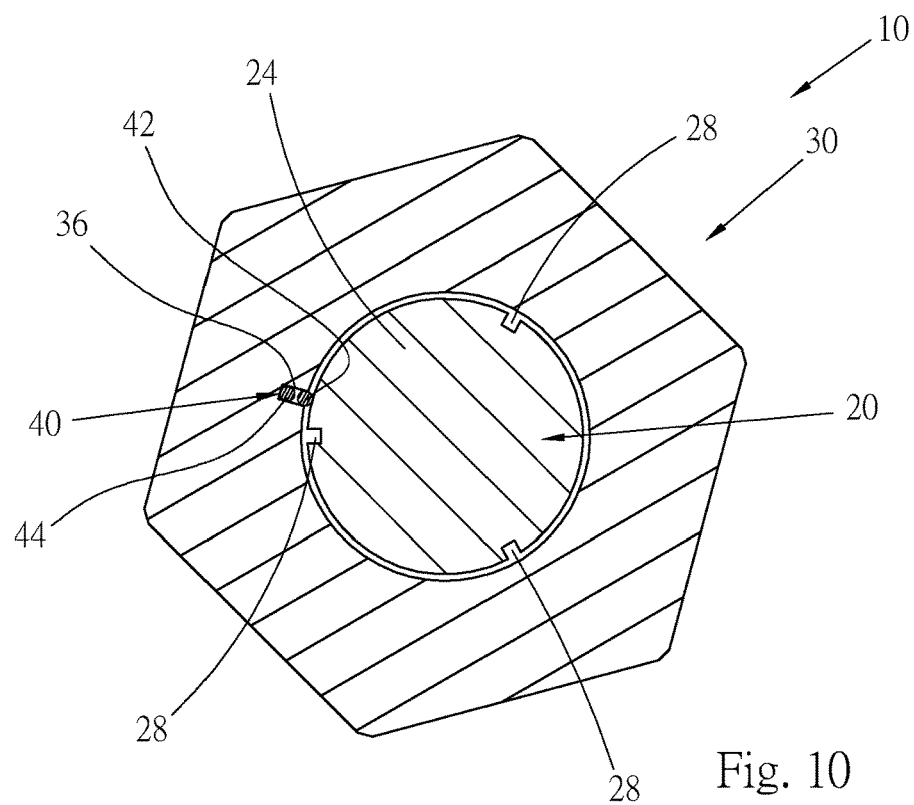
FIG. 10 is a sectional view taken along line 10-10 of FIG. 9 showing that the bolt and the nut are not locked by the engagement member.
Figure 10A:
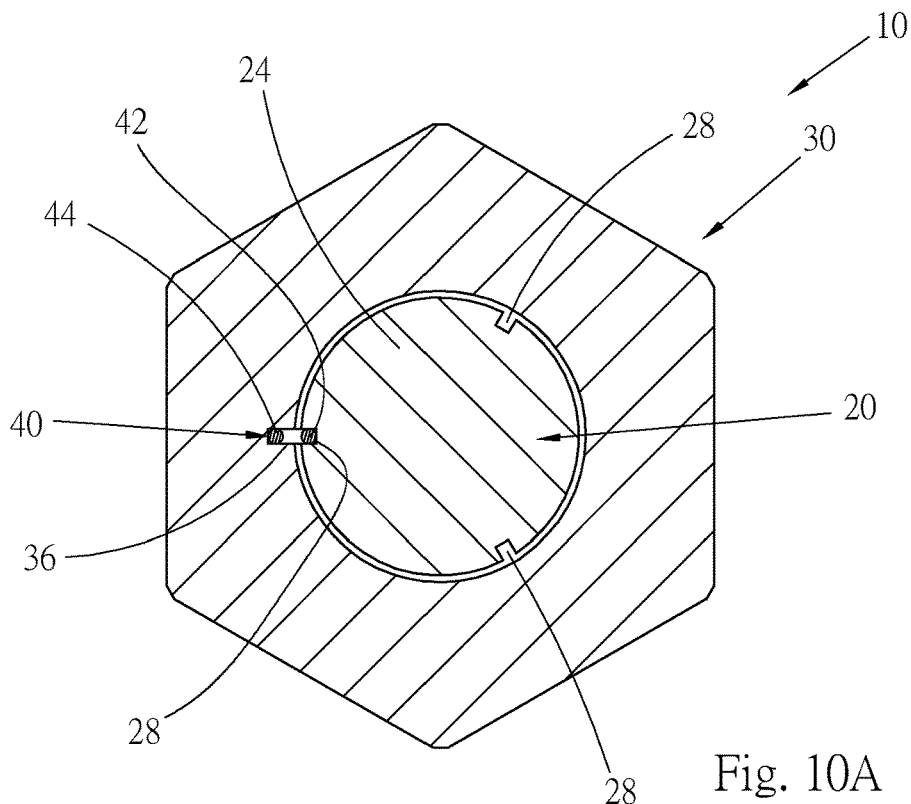
FIG. 10A is a sectional view which shows that the bolt and the nut are elastically locked by the engagement member.

When the bolt 20 is screwed into the nut 30, during the relative rotation of the bolt 20 and the nut 30, the securing section 42 of the engagement member 40 will contact the threaded portion or the groove 28 of the shank 24 of the bolt 20 to be elastically compressed or outward expanded. Please refer to FIG. 10. When the groove 28 is not aligned with the trough 36, both the received section 44 and the securing section 42 are positioned in the trough 36 of the nut 30. When the groove 28 of the bolt 20 is aligned with the trough 36 of the nut 30 as shown in FIG. 10A, the securing section 42 elastically outward expands to engage into the groove 28 and produce a locating feeling. After the screw-connection is completed, the securing section 42 of the engagement member 40 is engaged in the groove 28 of the bolt 20, while the received section 44 of the engagement member 40 is engaged in the trough 36 of the nut 30. This can achieve a locking effect and prevent the bolt 20 and the nut 30 from easy loosening. In this case, the reliability of the threaded assembly 10 is enhanced.

Figure 11:
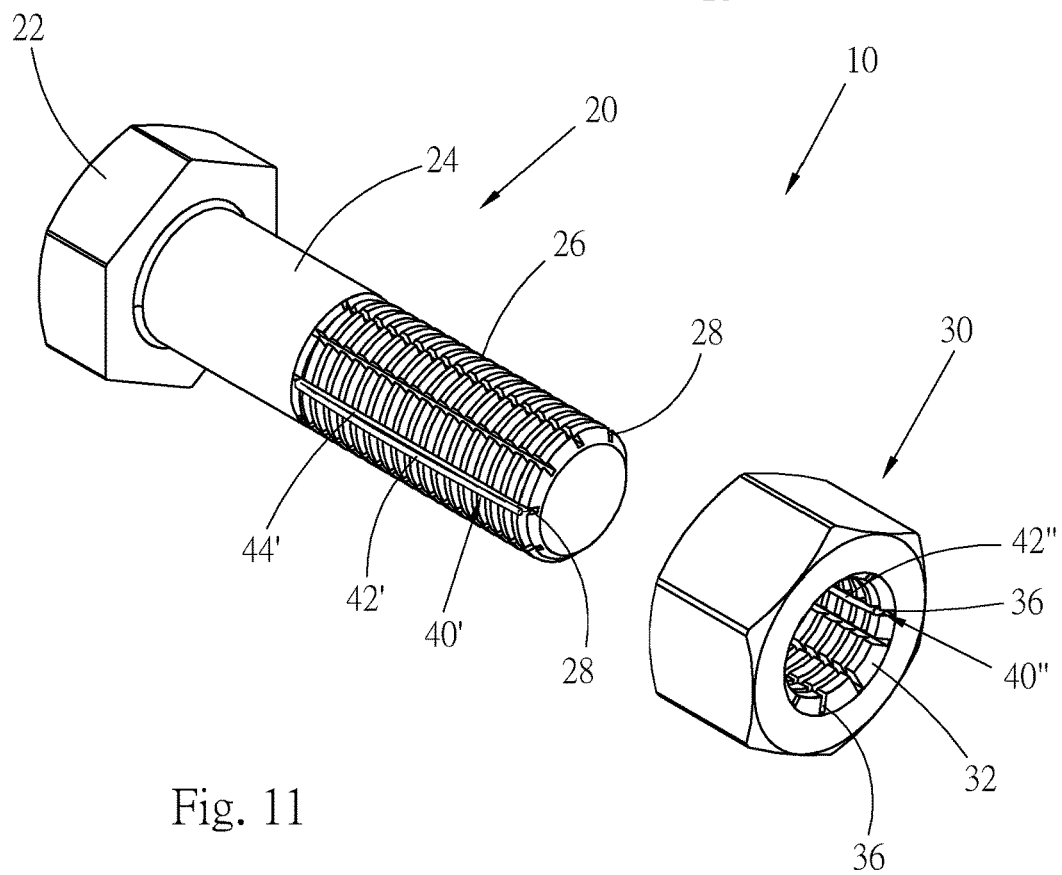
FIG. 11 is a perspective view of a bolt and nut combination according to a third preferred embodiment of the invention, a first positioning being disposed in one of the grooves of the bolt and a second positioning being disposed in one of the troughs of the nut which is separated from the bolt.
Figure 12:
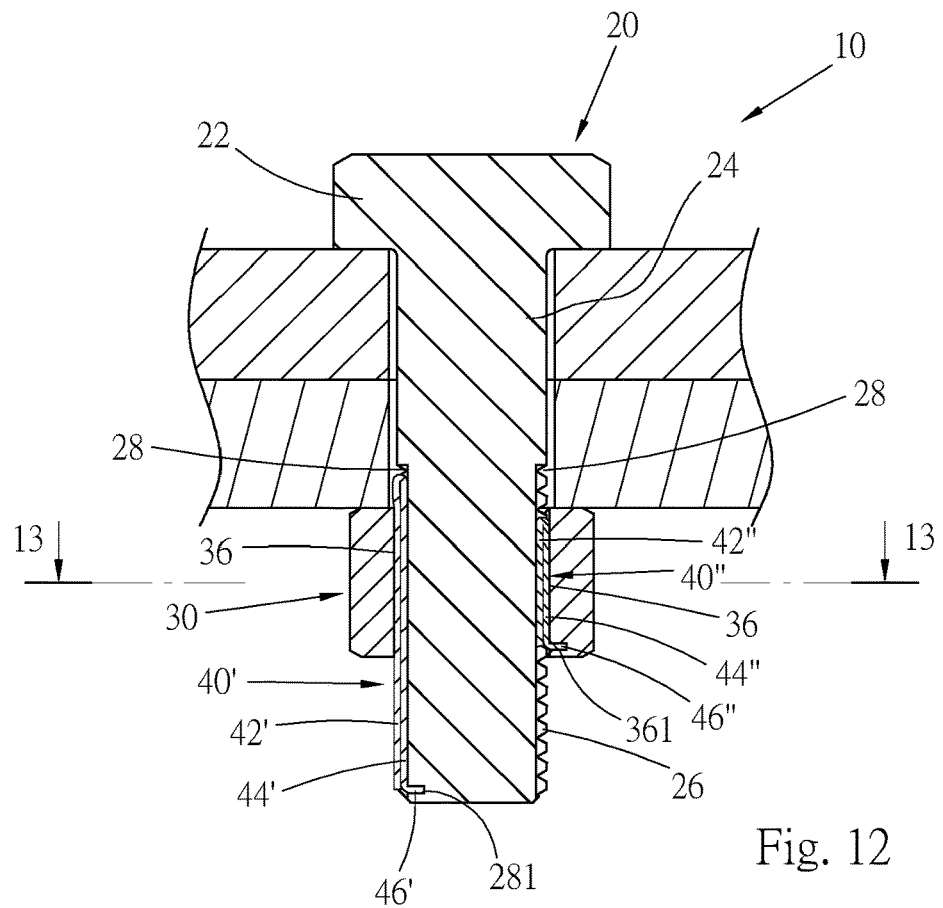
FIG. 12 is a longitudinal sectional view of the bolt and nut combination of FIG. 11 having the first and second positioning devices disposed in between the bolt and the nut for fastening two clamped components together.
Figure 13:
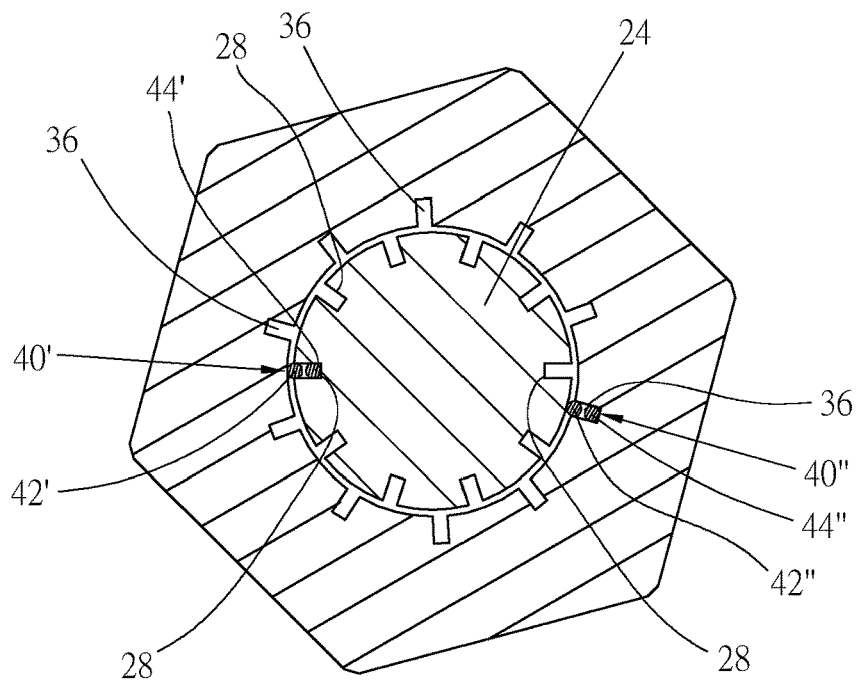
FIG. 13 is a sectional view taken along line 13-13 of FIG. 12 showing that the bolt and the nut are not locked by the engagement member.

Please now refer to FIGS. 11 to 13, which show a third embodiment of the threaded assembly 10 of the present invention. The third embodiment is different from the first and second embodiments in that in the third embodiment, there are two or more than two grooves 28 formed on the shank 24 of the bolt 20. One end of at least one groove 28 has a socket 281 inward recessed from the shank 24. Two or more than two troughs 36 are formed on the hole wall of the threaded hole 32 of the nut 30. One end of at least one trough 36 has a socket 361 inward recessed from the hole wall of the threaded hole 32.

There are at least two engagement members 40 such as a first engagement member 40' and a second engagement member 40". The received section 44' of the first engagement member 40' is disposed in the groove 28 of the bolt 20, while the received section 44" of the second engagement member 40" is disposed in the trough 36 of the nut 30.

Figure 13A:
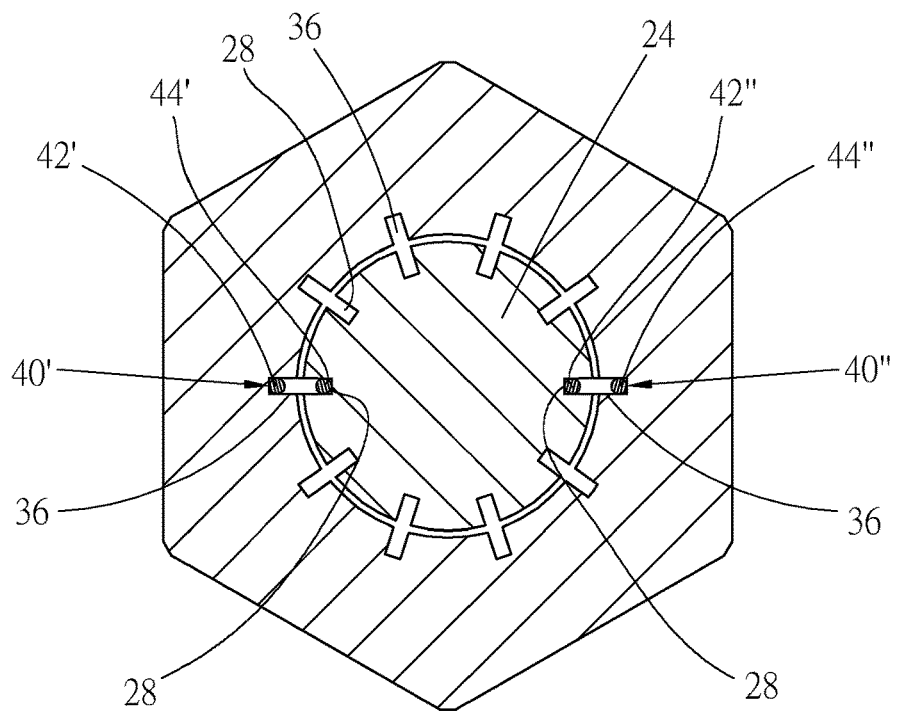
FIG. 13A is a sectional view which shows that the bolt and the nut are elastically locked by the engagement member.
Figure 14:
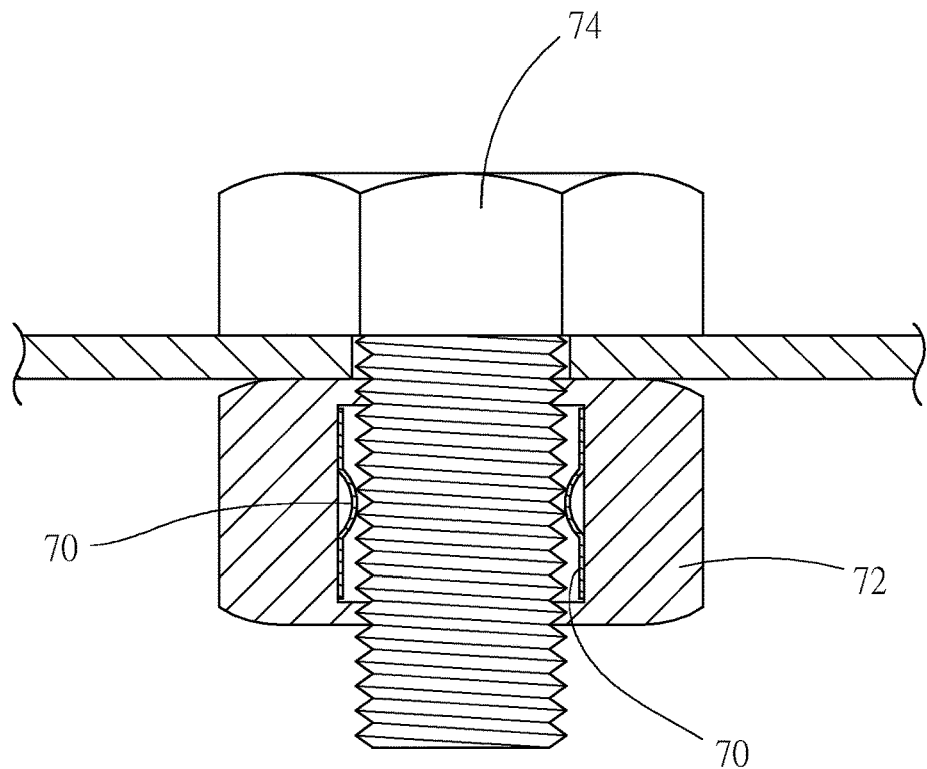
FIG. 14 is a side elevation in part section of a conventional bolt and nut combination having two urging devices disposed in between the threaded portion of the bolt and the nut.

In this embodiment, the first and second engagement members 40', 40" are respectively disposed on the bolt 20 and the nut 30. The securing sections 42', 42" of the two engagement members 40', 40" will contact different parts to be elastically compressed or outward expanded to provide locating feeling for a user as shown in FIGS. 13 and 13A. After the screw-connection is completed, the securing section 42' of the engagement member 40' connected with the bolt 20 elastically outward expands to engage into the trough 36 of the nut 30, while the securing section 42" of the engagement member 40" connected with the nut 30 also elastically outward expands to engage into the groove 28 of the bolt 20. Accordingly, the structure of the threaded assembly 10 is more rigidified to enhance the security of the threaded assembly 10.

In the threaded assembly 10 of the present invention, the engagement member 40 is engaged in both the groove 28 of the bolt 20 and the trough 36 of the nut 30 so that the connection strength of the threaded assembly 10 is enhanced. During the screw-connection process between the bolt 20 and the nut 30, the securing section 42 of the engagement member 40 will contact different parts to be elastically compressed or outward expanded. Accordingly, the securing section 42 will get closer to the received section 44 of the engagement member 40 or move away therefrom and produce the locating feeling in screw-connection for a user to judge whether the securing section 42 of the engagement member 40 is truly engaged to provide locking effect. In this case, even if the threaded assembly 10 is positioned in a high-frequency vibration, high voltage or high heat environment, the bolt 20 and the nut 30 are still prevented from loosening to ensure the connection between the bolt 20 and the nut 30 and enhance the security of the threaded assembly 10.

The above embodiments are only used to illustrate the present invention, not intended to limit the scope thereof. Many modifications of the above embodiments can be made without departing from the spirit of the present invention.

What is claimed is:

1. A lock threaded assembly comprising:
   a bolt having a bolt head and a shank, an outer circumference of the shank being formed with a threaded portion;
   at least one groove formed on the circumference of the shank of the bolt;
   a nut having a threaded hole having a hole wall, the shank of the bolt being screwed in the threaded hole of the nut;
   at least one trough formed on the hole wall of the nut; and
   at least one engagement member, the engagement member being an elongated elastic strip body having a securing section and a received section, the securing section and the received section being able to elastically get closer to each other or move away from each other, the received section being disposed in one of the groove of the bolt and the trough of the nut, the securing section is able to engage with the other of the trough of the nut and the groove of the bolt;
   wherein relative to the trough the groove is moveable between being aligned with the trough and not aligned with the trough, when the groove is not aligned with the trough, the securing section being moved toward the received section and moved into one of the groove of the bolt and the trough of the nut, when the groove is aligned with the trough, the securing section being moved into the other of the trough of the nut and the groove of the bolt;
   wherein the securing section of the engagement member has a connection end connected to the received section and a free end, the securing section is formed in an arcuate shape, a larger gap is formed between a body of the securing section and the received section, while a smaller gap is formed between the free end of the securing section and the received section.

2. The lock threaded assembly as claimed in claim 1, wherein one or more troughs are formed on the hole wall of the threaded hole of the nut, the shank of the bolt having the groove, the received section of the engagement member being inlaid in the groove, while the securing section of the engagement member being elastically engaged in the trough of the nut.

3. The lock threaded assembly as claimed in claim 2, wherein an insertion section outward extends from one end of the received section of the engagement member, the groove having a socket inward recessed from the shank, the insertion section of the engagement member being inserted in the socket of the groove.

4. The lock threaded assembly as claimed in claim 1, wherein the shank of the bolt has one or more grooves, the hole wall of the nut having one trough, the received section of the engagement member being inlaid in the trough, while the securing section of the engagement member being elastically engaged in the groove of the bolt.

5. The lock threaded assembly as claimed in claim 4, wherein an insertion section outward extends from one end of the received section of the engagement member, the trough having a socket inward recessed from the hole wall of the nut, the insertion section of the engagement member being inserted in the socket of the trough.

6. The lock threaded assembly as claimed in claim 1, wherein two or more than two grooves are formed on the shank of the bolt, the grooves being formed on the shank at intervals, two or more than two troughs being formed on the hole wall of the nut, the troughs being formed on the hole wall of the nut at intervals, the number of the engagement members being at least two, the received section of one of the engagement members being disposed in the groove of the bolt, the securing section of the engagement member being elastically engaged in the trough of the nut, the received section of the other engagement member being disposed in the trough of the nut, the securing section of the other engagement member being elastically engaged in the groove of the bolt.

7. The lock threaded assembly as claimed in claim 6, wherein an insertion section outward extends from one end of the received section of the engagement member, the groove having a socket inward recessed from the shank, the insertion section of the engagement member being inserted in the socket of the groove.

8. The lock threaded assembly as claimed in claim 6, wherein an insertion section outward extends from one end of the received section of the engagement member, the trough having a socket inward recessed from the hole wall of the nut, the insertion section of the engagement member being inserted in the socket of the trough.

9. The lock threaded assembly as claimed in claim 1, wherein the received section is disposed in the groove of the bolt, an insertion section outward extends from one end of the received section of the engagement member, the groove having a socket inward recessed from the shank, the insertion section of the engagement member being inserted in the socket of the groove.

10. The lock threaded assembly as claimed in claim 1, wherein an insertion section outward extends from one end of the received section of the engagement member, the trough having a socket inward recessed from the hole wall of the nut, the insertion section of the engagement member being inserted in the socket of the trough.

11. The lock threaded assembly as claimed in claim 1, wherein the securing section and the received section of the engagement member are side by side positioned, one end of the securing section being connected with one end of the received section.

12. The lock threaded assembly as claimed in claim 1, wherein the longitudinal direction of the groove is parallel to the axial direction of the shank of the bolt and the longitudinal direction of the trough is parallel to the axial direction of the threaded hole of the nut.

13. The lock threaded assembly as claimed in claim 1, wherein the engagement member is an elongated elastic metal strip body.

* * * * *